United States Patent
Kim et al.

(10) Patent No.: US 8,745,100 B2
(45) Date of Patent: Jun. 3, 2014

(54) METHOD AND APPARATUS FOR COLLECTING EVIDENCE

(75) Inventors: Ki Bom Kim, Chungbuk (KR); Hyun Uk Hwang, Daejeon (KR); Young Chan Shin, Daejeon (KR); Tae Joo Chang, Daejeon (KR); Cheol Won Lee, Daejeon (KR); Sung Jai Baik, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 675 days.

(21) Appl. No.: 12/626,786

(22) Filed: Nov. 27, 2009

(65) Prior Publication Data

US 2011/0047130 A1 Feb. 24, 2011

(30) Foreign Application Priority Data

Aug. 21, 2009 (KR) .................. 10-2009-0077732

(51) Int. Cl.
G06F 7/00 (2006.01)
G06F 17/30 (2006.01)

(52) U.S. Cl.
USPC .......................................... 707/822; 707/692

(58) Field of Classification Search
USPC ................................. 707/822, 692
See application file for complete search history.

(56) References Cited

U.S. PATENT DOCUMENTS

| 7,899,882 B2 * | 3/2011 | Shannon et al. ............... 709/217 |
| 2004/0260733 A1 | 12/2004 | Adelstein et al. |
| 2007/0245331 A1 * | 10/2007 | Daynes et al. ................. 717/166 |
| 2009/0165142 A1 * | 6/2009 | Adelstein et al. ............... 726/26 |
| 2009/0271412 A1 * | 10/2009 | Lacapra et al. ................. 707/10 |

FOREIGN PATENT DOCUMENTS

| KR | 1020020093188 A | 12/2002 |
| KR | 1020040110667 A | 12/2004 |
| KR | 1020060104270 A | 10/2006 |
| KR | 1020070068162 A | 6/2007 |

OTHER PUBLICATIONS

Chang et al., "Initial Case Analysis using Windows Registry in Computer Forensics," Future Generation Communication and Networking (FGCN 2007), Dec. 2007.*
Chang et al.: Initial Case Analysis using Windows Registry in COinputer Forensics,http://ieeexplore.ieee.org/xpis/abs_all.jSp?arnumber=4426183&tag= 1.*

* cited by examiner

Primary Examiner — Kuen Lu
(74) Attorney, Agent, or Firm — Ladas & Parry LLP

(57) ABSTRACT

Method and apparatus for collecting evidence are provided. An exemplary embodiment enhances accuracy and efficiency of collecting evidence by analyzing link information in the target computer and collecting collection target file. And the exemplary embodiment can collect evidence from a target computer as well as from a remote computer through analyzing the link information in the target computer, identifying the path of collection target file and extracting the target file.

11 Claims, 2 Drawing Sheets

METHOD AND APPARATUS FOR COLLECTING EVIDENCE

CROSS-REFERENCE TO RELATED APPLICATIONS

This application claims priority under 35 U.S.C. §119 to Korean Patent Application No. 10-2009-0077732, filed on Aug. 21, 2009, in the Korean Intellectual Property Office, the disclosure of which is incorporated herein by reference in its entirety.

TECHNICAL FIELD

The following disclosure relates to a method and an apparatus for collecting digital forensic evidence, and in particular, to a method and an apparatus for collecting evidence, which are able to collect a collection target file present in a target computer as well as a remote computer.

BACKGROUND

Digital forensics includes the steps of collection, imaging, analysis, and presentation of evidence. In a related-art digital forensics, information only in a target computer is collected. Modern commercialized products such as EnCase and FTK collect data from one target computer, and also investigate a plurality of target computers in network connection-based remote forensics, but are limited by being able to collect data stored in an individual computer. That is, in a related-art digital forensics, valuable files such as document files that individual computers have worked through network sharing cannot be collected.

As an example, U.S. Patent Publication No. 20040260733 A1 entitled "Remote Collection of Computer Forensic Evidence" discloses a method for collecting remote evidence in digital forensics, which collects and analyzes computer generated volatile information, such as various log files, processes, and networks, but is limited to collecting data only in an individual computer.

SUMMARY

In one general aspect, a method includes: acquiring path information of a collection target file; and collecting the collection target file by connecting to a target computer or another computer using the acquired path information.

In another general aspect, an apparatus for collecting evidence includes: an access module accessing a storage medium of a target computer; a file system analysis module analyzing a file system of the storage medium; a link analysis module acquiring path information of a collection target file by analyzing a link file through the file system analysis module; and a target file extraction module extracting the collection target file using the acquired path information of the collection target file.

Other features and aspects will be apparent from the following detailed description, the drawings, and the claims.

DETAILED DESCRIPTION OF EMBODIMENTS

Figure 1:
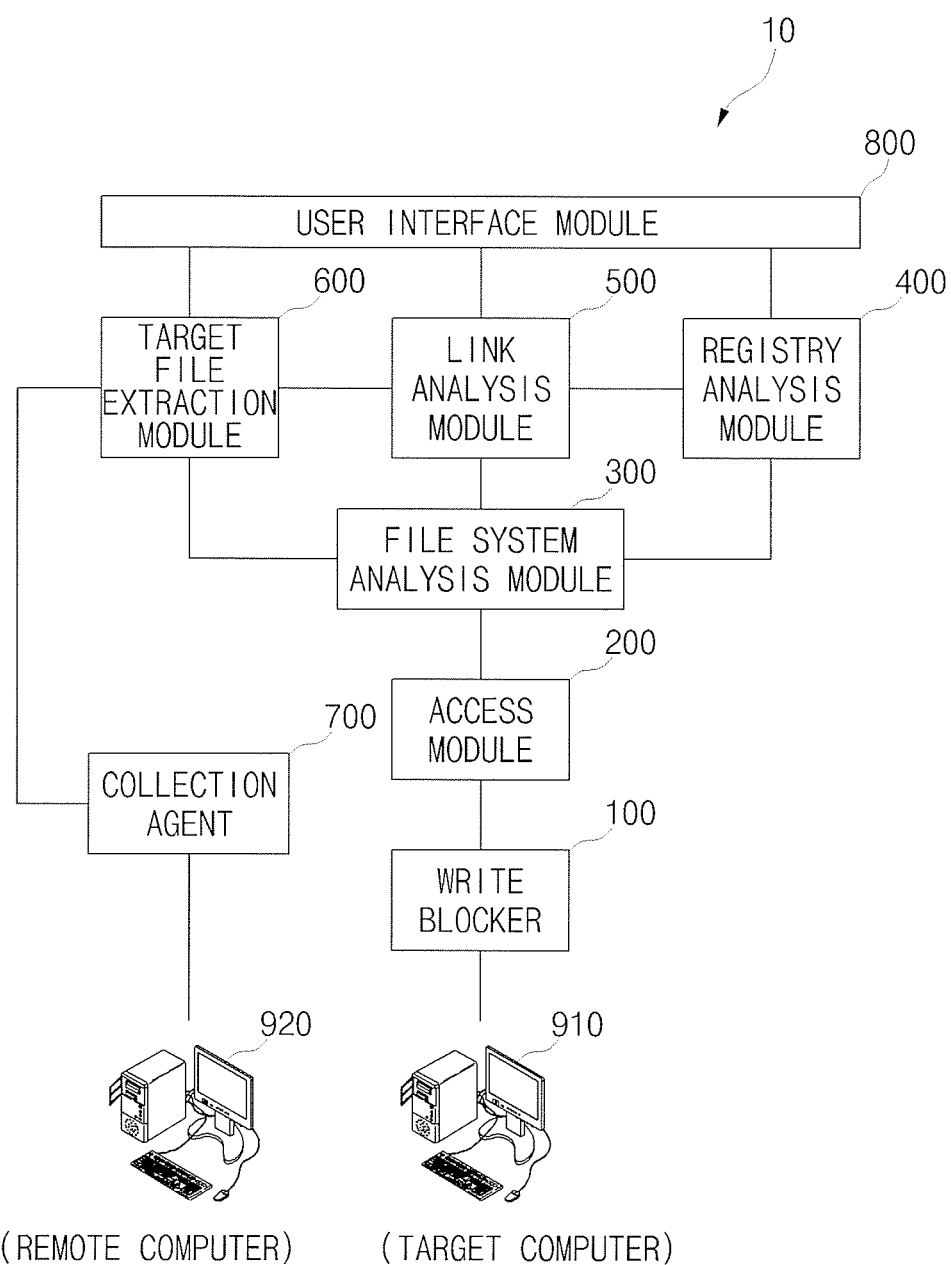
FIG. 1 is a diagram illustrating an apparatus for collecting evidence according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
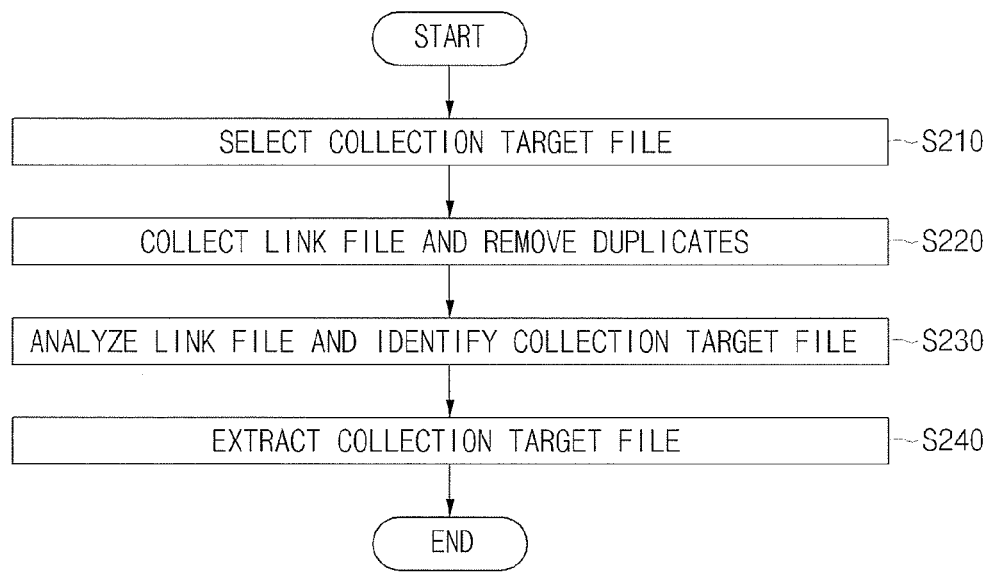
FIG. 2 is a flowchart illustrating a method for collecting evidence according to an exemplary embodiment.
Figure 3:
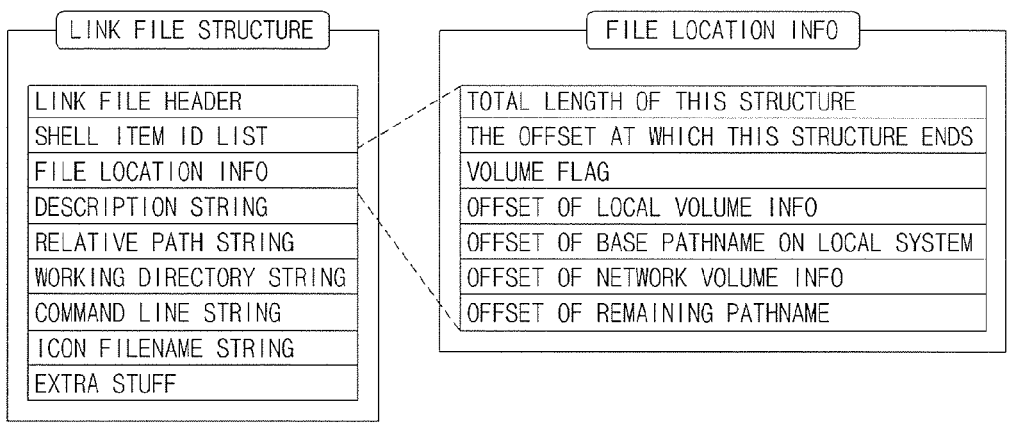
FIG. 3 is a diagram illustrating an operation of a link analysis module of FIG. 1.

Hereinafter, methods and apparatuses for collecting evidence according to exemplary embodiments will be described with reference to FIGS. 1 through 3. FIG. 1 is a diagram illustrating an apparatus for collecting evidence according to an exemplary embodiment. FIG. 2 is a flowchart illustrating a method for collecting evidence according to an exemplary embodiment. FIG. 3 is a diagram illustrating an operation of a link analysis module of FIG. 1.

Referring to FIG. 1, an evidence-collecting apparatus 10 includes a write blocker 100, an access module 200, a file system analysis module 300, a registry analysis module 400, a link analysis module 500, a target file extraction module 600, and a user interface module 800.

The write blocker 100 is a device ensuring that contents of a hard disk are unchanged for the integrity of a target computer 910. The write blocker 100 may be omitted.

The access module 200 is a module that accesses storage media of the target computer 910, reads a raw data, and ensures that file states, for example, metadata such as file creation time, modification time, and access time or contents are not modified.

The file system analysis module 300 analyzes the file system, for example, NTFS, and FAT12/16/32 of the storage media through the access module 200. The file system analysis module 300 recovers and lists normal files and deleted files, and provides an access function by units of file.

The registry analysis module 400 accesses registry files generated and managed by an operating system such as Microsoft Windows through the file system analysis module 300, and analyzes contents of the registry. The registry analysis module 400 may acquire link information by analyzing the contents of the registry, or acquire the absolute path of collection target file.

The link analysis module 500 inquires and analyzes a link file through the file system analysis module 300 to identify and acquire location information, for example, path information of the collection target file from the link file. Also, the link analysis 500 inquires and analyzes link information through the registry analysis module 400 to identify and acquire path information of the collection target file.

The target file extraction module 600 extracts the collection target file based on the path information of the collection target file acquired by the link analysis module 500. Alternatively, the target file extraction module 600 extracts the collection target file using the absolute path of the collection target file acquired by the registry analysis module 400. In this case, if the collection target file exists in the target computer 910, the target file extraction module 600 inquires and extracts contents of the collection target file through the file system analysis module 300. If the collection target file exists in a remote computer 920, the target file extraction module 600 accesses the remote computer 920 through the collection agent 700 to inquire and collect the contents of the collection target file.

Here, the collection agent 700 may collect the collection target file from the remote computer 920, while maintaining integrity, including the access module and the file system analysis module. If it is impossible to access the remote computer 920 with integrity, the collection agent 700 takes charge of functions of access and collection through API provided by the operating system. The remote computer 920 is a computer that is connected to the target computer 910 over the network. The remote computer 920 may be connected to the target computer 910 through a network drive and a shared folder to share files with the target computer 910.

The user interface module 800 provides results from the file system analysis module 300, the registry analysis module 400, and the link analysis module 500 to an investigator.

Particularly, the user interface module 800 displays the contents of the collection target file and the link information provided from the link analysis module 500 and the collection target file extraction module 600.

Hereinafter, a method for collecting evidence according to an exemplary embodiment will be described in detail with reference to FIGS. 2 and 3.

In operation S210, a collection target file is selected. In this case, the collection target file may be selected by file extensions in a file extension table (hereinafter, referred to as FET) like Table 1 below.

TABLE 1

| Representative Extension | Relative Extension |
|---|---|
| HWP | HWP |
|  | HWT |
| PPT | PPT |
|  | PPTX |
|  | PPTM |
|  | PPSX |
|  | PPS |
|  | PPSM |

TABLE 1-continued

| Representative Extension | Relative Extension |
|---|---|
|  | POTX |
|  | POT |
|  | POTM |
| XLS | XLS |
|  | XLSX |
|  | XLSM |
|  | XLAM |
|  | XLTX |
|  | XLT |
|  | XLA |
|  | XLM |
| DOC | DOC |
|  | DOCX |
|  | DOCM |
|  | DOTX |
|  | DOTM |
|  | DOT |

Table 1, that is, FET, shows representative extensions and relative extensions of files that are collection targets. One or more extensions may be maintained according to the version of the application software. The link analysis module 500 identifies the extensions of the collection target files, using information of the FET table. For example, the collection target files may be collected using all extensions, but, for efficiency and quickness of the investigation, only important investigation targets may be selected. That is, when the investigation is focused on document files, the investigation may be limited to representative extensions such as HWP, PPT, XLS, DOC, GUL, and TXT.

In operation S220, link files related to the collection target files are collected, and duplicates are removed.

Specifically, the link analysis module 500 acquires path information of the link files, and inquires and acquires all link files present in a corresponding path, using the file system analysis module 300. In this case, duplicates among the acquired link files may be removed. For example, the duplicates may be removed based on the absolute paths of the acquired link files. Since Microsoft Window operating system does not discriminate between capital/small letters, the duplicates may be case-insensitively removed.

The link analysis module 500 acquires a registry key path in which link information exists, and identifies the path information of the link files or collection target files through the registry analysis module 400. The link analysis module 500 inquires and acquires the link files based on the path information of the acquired link files through the file system analysis module 300. The duplicates may be removed using the absolute paths of the acquired link files.

Here, the link analysis module 500 may acquire the path information of the link files using Tables 2 and 3 below. Alternatively, the link analysis module 500 may acquire a path of a registry key in which the link information exist using Tables 2 and 3 below.

TABLE 2

| Type | Location |
|---|---|
| File | C:\Documents and Settings\<Random_Name>\Recent |
|  | C:\Users\<Random_Name>\AppData\Roaming\Microsoft\Windows\Recent |
| Registry key path | HKU\<Random_Name>\Software\Microsoft\Windows\CurrentVersion\Explorer\RecentDocs |

Table 2 represents a common link information table (hereinafter, referred to as CLT), which shows link file path and registry key path about recently accessed files managed by the operating system regardless of application software and extensions. Table 2 contains path of the link file and the registry key according to the version of the operating system.

TABLE 3

| Extension | Type | Location |
| --- | --- | --- |
| HWP | File | C:\Documents and Settings\<Random_Name>\Application Data\Hnc\Office\Recent<br>C:\Users\<Random_Name>\AppData\Roaming\Hnc\Office\Recent |
| | Registry key path | HKU\<Random_Name>\Software\Microsoft\Windows\Current Version\Explorer\ComDlg32\OpenSaveMRU\hwp<br>HKU\<Random_Name>\Software\Microsoft\Windows\CurrentVersion\Explorer\RecentDocs\.hwp<br>HKU\<Random_Name>\Software\HNC\HWP\7.0\HwpFrame\RecentFile<br>HKU\<Random_Name>\Software\HNC\HWP\<Random_Name>\RecentFile |
| PPT | File | C:\Documents and Settings\<Random_Name>\Application Data\Microsoft\Office\Recent<br>C:\Users\<Random_Name>\AppData\Roaming\Microsoft\Office\Recent |
| | Registry key path | HKU\<Random_Name>\Software\Microsoft\Windows\CurrentVersion\Explorer\ComDlg32\OpenSaveMRU\ppt<br>HKU\<Random_Name>\Software\Microsoft\Windows\Current Version\Explorer\RecentDocs\.ppt<br>HKU\<Random_Name>\Software\Microsoft\Windows\CurrentVersion\Explorer\ComDlg32\OpenSaveMRU\pptx<br>HKU\<Random_Name>\Software\Microsoft\Windows\CurrentVersion\Explorer\RecentDocs\.pptx<br>HKU\<Random_Name>\Software\Microsoft\Office\<Random_Name>\PowerPoint\Recent Files List |
| XLS | File | C:\Documents and Settings\<Random_Name>\Application Data\Microsoft\Office\Recent<br>C:\Users\<Random_Name>\AppData\Roaming\Microsoft\Office\Recent |
| | Registry key path | HKU\<Random_Name>\Software\Microsoft\Windows\CurrentVersion\Explorer\ComDlg32\OpenSaveMRU\xls<br>HKU\<Random_Name>\Software\Microsoft\Windows\CurrentVersion\Explorer\RecentDocs\.xls<br>HKU\<Random_Name>\Software\Microsoft\Windows\CurrentVersion\Explorer\ComDlg32\OpenSaveMRU\xlsx<br>HKU\<Random_Name>\Software\Microsoft\Windows\CurrentVersion\Explorer\RecentDocs\.xlsx<br>HKU\<Random_Name>\Software\Microsoft\Office\<Random_Name>\Excel\Recent Files List |
| DOC | File | C:\Documents and Settings\<Random_Name>\Application Data\Microsoft\Office\Recent<br>C:\Users\<Random_Name>\AppData\Roaming\Microsoft\Office\Recent |
| | Registry key path | HKU\<Random_Name>\Software\Microsoft\Windows\CurrentVersion\Explorer\ComDlg32\OpenSaveMRU\doc<br>HKU\<Random_Name>\Software\Microsoft\Windows\CurrentVersion\Explorer\RecentDocs\.doc<br>HKU\<Random_Name>\Software\Microsoft\Windows\CurrentVersion\Explorer\ComDlg32\OpenSaveMRU\docx<br>HKU\<Random_Name>\Software\Microsoft\Windows\CurrentVersion\Explorer\RecentDocs\.docx<br>HKU\<Random_Name>\Software\Microsoft\Office\<Random_Name>\Word\Recent Files List |

\* <Random_Name>: Random Folder Name or Random Registry Key Name

Table 3 represents an extension vs. link information table (hereinafter, referred to as ELT), which shows link file path and registry key path recently accessed files managed by the operating system and application software, for each file extension. Table 3 contains paths of the link file and the registry key according to the version of the operating system and application software respectively.

In operation S230, the link file is analyzed, and the collection target file is identified.

Specifically, the location of the collection target file is identified through a detailed analysis about the respective acquired link files. FIG. 3 shows the structure of a window link file. The location of the collection target file may be found by analyzing the shell item ID list and the file location info domains. When analyzing the link structure, the total path of the collection target file may be acquired from the shell item ID list, if it exists. Also, the path of the collection target file may be acquired by analyzing the file location info domain. The shell item ID list has a structure in which respective items are listed. If the respective listed items are connected, the total path of the collection target file may be acquired. If the volume flag is 0 in the file location info domain, this means a file that exists in the target computer 910. If the volume flag is 1, this means a file that exists in the remote computer 920. When the file exists in the target computer 910, the offset of local volume info and the offset of base pathname on local system of the file location info domain are analyzed to acquire the absolute path. When the file exists in the remote computer 920, the offset of network volume info and the offset of remaining pathname of the file location info domain are analyzed to acquire the absolute path for remote connection.

On the other hand, the absolute path may be directly acquired through a registry analysis. In this case, the absolute path of the collection target file may be directly acquired by acquiring the registry key path and analyzing a value corresponding to the registry key path.

A list of the collection target is generated by comparing the acquired absolute paths of the collection target files and filtering duplicate collection target files. Since Microsoft Windows operating system does not discriminated between the capital/small letters, duplicates may be case-insensitively removed.

In operation S240, the target file extraction module 600 extracts the collection target file using the acquired path information of the collection target file.

When the collection target file exists in the target computer 910, the collection target file is accessed and extracted through the file system analysis module 300. When the collection target file exists in the remote computer 920, a corresponding file may be accessed by connecting to the remote computer 920 through the collection agent 700. If there is no collection agent 700, a file access API (fopen, fread or the like in C language) may be used for a direct access. The metadata and contents of the extracted file are provided to an investigator through the user interface module 800.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for collecting evidence, comprising:
    blocking a hard disk of a target computer or another computer to prevent contents of the hard disk from being changed;
    accessing storage media of the target computer or another computer;
    reading raw data stored in the storage media to ensure that file states are not modified;
    acquiring path information of a collection target file;
    collecting the collection target file by connecting to the target computer or another computer using the acquired path information,
    wherein the acquiring of path information of the collection target file comprises acquiring path information of a link file related to the collection target file, collecting the link file using the path information, analyzing the link file; and
    removing a duplicate of the link file based on an absolute path.

2. The method of claim 1, further comprising selecting the collection target file by selecting the extension of the collection target file using a file extension table.

3. The method of claim 2, wherein the extension of the collection target file is selected from the group consisting of HWP, PPT, XLS, DOC, GUL, and TXT.

4. The method of claim 1, further comprising acquiring an absolute path for connection to the other computer if the collection target file exists in the other computer as a result of the analyzing of the link file.

5. A method for collecting evidence, comprising:
    blocking a hard disk of a target computer or another computer to prevent contents of the hard disk from being changed;
    accessing storage media of the target computer or another computer;
    reading raw data stored in the storage media to ensure that file states are not modified;
    acquiring path information of a collection target file; and
    collecting the collection target file by connecting to the target computer or another computer using the acquired path information,
    wherein the acquiring of path information of the collection target file comprises analyzing a registry key stored in the target computer, acquiring the path information of the collection target file using a result of the analyzing of a registry key, and acquiring an absolute path of the collection target file, and wherein the analyzing of a registry key comprises acquiring a registry key path and analyzing a registry key corresponding to the registry key path;
    removing a duplicate of the collection target file based on an absolute path.

6. An apparatus for collecting evidence, comprising:
    a computer system comprising a processor and a memory;
    a write blocker operating on the computer system and blocking a hard disk of a target computer;
    an access module operating on the computer system and accessing a storage medium of the target computer;
    a file system analysis module operating on the computer system and analyzing a file system of the storage medium;
    a link analysis module operating on the computer system and acquiring path information of a collection target file by analyzing a link file through the file system analysis module, wherein a duplicate of the link file is removed based on an absolute path; and
    a target file extraction module operating on the computer system and extracting the collection target file using the acquired path information of the collection target file, wherein a duplicate of the collection target file is removed based on an absolute path.

7. The apparatus of claim 6, further comprising a user interface module displaying the link information and contents of the collection target files.

8. The apparatus of claim 6, further comprising a registry analysis module analyzing a registry key by accessing a registry file through the file system analysis module, wherein the link analysis module acquires a location of the link file and an absolute path of the collection target file from a result of the registry key analysis.

9. The apparatus of claim 8, wherein the link analysis module removes a duplicate of the acquired link file based on the absolute path.

10. The apparatus of claim 6, wherein the link analysis module acquires an absolute path of the collection target file if the collection target file exists in the target computer in which the link file is collected as a result of the analysis of the link file, and
    the link analysis module acquires an absolute path for connection to another computer if the collection target file exists in the other computer except the target computer as the result of the analysis of the link file.

11. The apparatus of claim 10, further comprising a collection agent connecting to the other computer to collect the collection target file.

* * * * *